(12) United States Patent
Zitnick, III et al.

(10) Patent No.: US 8,788,529 B2
(45) Date of Patent: *Jul. 22, 2014

(54) INFORMATION SHARING BETWEEN IMAGES

(75) Inventors: Charles Lawrence Zitnick, III, Seattle, WA (US); Richard Lloyd Hughes, Monroe, WA (US)

(73) Assignee: Microsoft Corp., Redmond, WA (US)

( * ) Notice: Subject to any disclaimer, the term of this patent is extended or adjusted under 35 U.S.C. 154(b) by 475 days.

This patent is subject to a terminal disclaimer.

(21) Appl. No.: 11/679,080

(22) Filed: Feb. 26, 2007

(65) Prior Publication Data

US 2008/0209010 A1 Aug. 28, 2008

(51) Int. Cl.
G06F 17/30 (2006.01)
(52) U.S. Cl.
USPC ........................................... 707/783; 707/915
(58) Field of Classification Search
USPC ............... 707/100–104.1, 705, 999.003, 915, 707/783; 382/181, 190, 206, 305; 709/219
See application file for complete search history.

(56) References Cited

U.S. PATENT DOCUMENTS

| | | | | |
|---|---|---|---|---|
| 6,041,133 | A * | 3/2000 | Califano et al. | 382/124 |
| 7,038,712 | B1 * | 5/2006 | Livingston et al. | 348/187 |
| 7,127,106 | B1 * | 10/2006 | Neil et al. | 382/181 |
| 2002/0114522 | A1 * | 8/2002 | Seeber | 382/218 |
| 2002/0181780 | A1 * | 12/2002 | Simon et al. | 382/209 |
| 2004/0015479 | A1 * | 1/2004 | Meek et al. | 707/1 |
| 2004/0076313 | A1 * | 4/2004 | Bronstein et al. | 382/118 |
| 2004/0202385 | A1 * | 10/2004 | Cheng et al. | 382/305 |
| 2005/0104976 | A1 * | 5/2005 | Currans | 348/231.5 |
| 2005/0162523 | A1 * | 7/2005 | Darrell et al. | 348/211.2 |
| 2006/0034523 | A1 * | 2/2006 | Park | 382/232 |
| 2006/0227992 | A1 * | 10/2006 | Rathus et al. | 382/100 |
| 2007/0150403 | A1 * | 6/2007 | Mock et al. | 705/37 |

OTHER PUBLICATIONS

Baumberg, "Reliable feature matching across widely separated views", Issue Date: 2000, Computer Vision and Pattern Recognition, 2000. Proceedings. IEEE Conference, vol. 1, p. 774-781.*
Larry Zitnick, "Object Instance Recognition", http://web.archive.org/web/20070107074146/http://research.microsoft.com/~larryz/objectrecognition.htm, Jan. 7, 2007.*
Baluja, S., and H. A. Rowley, Boosting Sex Identification Performance, International Journal of Computer Vision, Jan. 2007, pp. 111-119, vol. 71, No. 1, Springer.
Rowley, H., Jing, Y., Baluja, S., Large-scale image-based adult-content filtering, International Conference on Computer Vision Theory and Applications, Feb. 2006, pp. 290-296, Springer.
Zitnick, L., J. Sun, R. Szeliski, and S. Winder, Object instance recognition using triplets of feature symbols, Microsoft Research TechReport, MSR-TR-2007-53, pp. 1-15, Apr. 2007.

* cited by examiner

*Primary Examiner* — Shiow-Jy Fan
(74) *Attorney, Agent, or Firm* — Steve Wight; Carole Boelitz; Micky Minhas (57) ABSTRACT

A content-based image retrieval technique for sharing image information between images. In the present image information sharing technique digital photographs containing relevant comments and links to web pages are supplied by a set of authors. A user of the image information sharing technique takes a digital picture of something that interests them, such as, for example, a poster, a product, a painting, and uploads it to an image information sharing server. The image information sharing technique then matches the photo to an image in an image information sharing database. The comments and web links associated with the matched photo are subsequently sent to the user.

17 Claims, 9 Drawing Sheets

INFORMATION SHARING BETWEEN IMAGES

BACKGROUND

Searching for images in a large database has in the past been very cumbersome. Content-based image retrieval, also known as query by image content and content-based visual information retrieval, is the application of computer vision to the image retrieval problem, that is, the problem of searching for digital images in large databases. "Content-based" means that the search makes use of the contents of the images themselves, rather than relying on metadata such as captions or keywords, which is typically input by humans.

There is growing interest in content-based image retrieval because of the limitations inherent in meta data-based systems. Textual information about images can be easily searched using existing technologies, but this type of a search requires humans to personally describe every image in the database. This is impractical for very large databases, or for images that are generated automatically, such as, for example, from surveillance cameras. It is also possible to miss images that use different synonyms in their descriptions.

The ideal content-based image retrieval system from a user's perspective involves semantic retrieval, where the user makes a request like "find pictures of a flower". This type of open-ended task is very difficult for computers to perform— pictures of roses and lilies look very different. Current content-based information systems therefore generally make use of lower level features like texture, color, and shape in searching for images, although some systems take advantage of higher-level features.

Object instance (or known object) recognition is one type of content-based image retrieval. Object instance recognition is the task of recognizing a specific object in an image. Object instance recognition does not recognize categories of objects, but instead a particular object from a category. By way of example, these specific objects may include specific artwork (such as the Mona Lisa), a specific photograph, the front of a specific restaurant, or an object on a supermarket shelf.

Major search engines have yet to implement content based image retrieval and object instance recognition image retrieval to browse or search through their indexes of images, the largest of which contain links to billions of photographs and graphics. Still, research by both industry and academia has achieved some intriguing advances of late that sidestep the need for keywords—and address the challenge of analyzing the content of images in large databases.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment of the present image information sharing technique photographs or images are supplied by a set of authors. The supplied images are associated with relevant information related to the photographs and/or objects in the photographs, such as, for example, comments and links to web pages. A user of the image information sharing technique acquires a picture, such as for example, by taking a picture of an object that interests them. Such an object could be, for example, a poster, a product, or a painting. The user uploads the picture to an image information sharing server (or servers). The image information sharing server then searches an image information sharing database which stores the authored images and matches the uploaded picture to an image in the database. Information regarding the image, or an object in the image, such as comments and web links associated with the matched photo, are subsequently sent to the user. The user can then optionally follow the links to obtain additional information about the image or an object in the image.

In one embodiment, the image information sharing technique uses a content-based image retrieval process to match the photograph or image uploaded by the user to an image in the image information sharing database. This allows a user to query a database using images vice keywords. In one embodiment, object instance recognition, a form of content-based image retrieval, is used to match an object in the image submitted by a user to an object in an image in the image information sharing database. For processing user queries the image information sharing technique can rely entirely on the content of the image sent by the user.

Obtaining additional information on objects in images submitted to the image information sharing server is a synchronous user experience, which is different from other two-part "email the image first, then wait for the response email" style systems. Since in one embodiment an image information sharing application is used to send the image to be used to query the image information sharing database, the image information sharing technique is independent of an email system and hence faster and more convenient in transmission and receipt of images and image information.

It is noted that while the foregoing limitations in existing database searching schemes described in the Background section can be resolved by a particular implementation of the present image information sharing technique, this is in no way limited to implementations that just solve any or all of the noted disadvantages. Rather, the present technique has a much wider application as will become evident from the descriptions to follow.

In the following description of embodiments of the present disclosure reference is made to the accompanying drawings which form a part hereof, and in which are shown, by way of illustration, specific embodiments in which the technique may be practiced. It is understood that other embodiments may be utilized and structural changes may be made without departing from the scope of the present disclosure.

DESCRIPTION OF THE DRAWINGS

The specific features, aspects, and advantages of the disclosure will become better understood with regard to the following description, appended claims, and accompanying drawings where:

DETAILED DESCRIPTION 1.0 The Computing Environment

Before providing a description of embodiments of the present image information sharing image information sharing technique, a brief, general description of a suitable computing environment in which portions thereof may be implemented will be described. The present technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
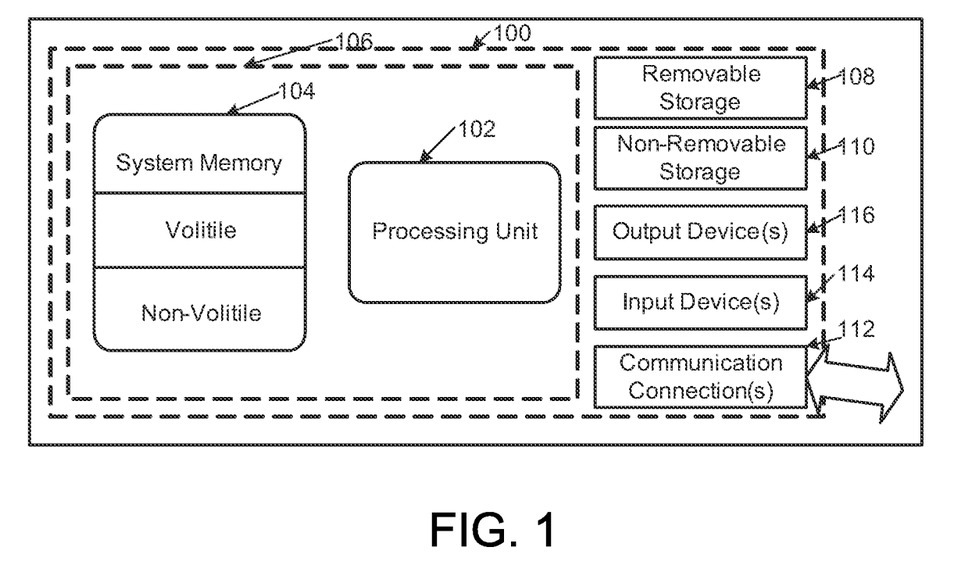
FIG. 1 is a diagram depicting a general purpose computing device constituting an exemplary system for a implementing a component of the present image information sharing technique.

FIG. 1 illustrates an example of a suitable computing system environment. The computing system environment is only one example of a suitable computing environment and is not intended to suggest any limitation as to the scope of use or functionality of the present image information sharing technique. Neither should the computing environment be interpreted as having any dependency or requirement relating to any one or combination of components illustrated in the exemplary operating environment. With reference to FIG. 1, an exemplary system for implementing the present image information sharing technique includes a computing device, such as computing device 100. In its most basic configuration, computing device 100 typically includes at least one processing unit 102 and memory 104. Depending on the exact configuration and type of computing device, memory 104 may be volatile (such as RAM), nonvolatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may have various input device(s) 114 such as keyboard, mouse, microphone, pen, voice input device, touch input device, and so on. Output device(s) 116 such as a display, speakers, a printer, and so on may also be included. All of these devices are well known in the art and need not be discussed at length here.

Device 100 can include a camera as an input device 114 (such as a digital/electronic still or video camera, or film/photographic scanner), which is capable of capturing an image or a sequence of images, as an input device. Further, multiple cameras could be included as input devices. The images from the one or more cameras can be input into the device 100 via an appropriate interface (not shown). However, it is noted that image data can also be input into the device 100 from any computer-readable media as well, without requiring the use of a camera.

The present image information sharing technique may be described in the general context of computer-executable instructions, such as program modules, being executed by a computing device. Generally, program modules include routines, programs, objects, components, data structures, and so on, that perform particular tasks or implement particular abstract data types. The present image information sharing technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present image information sharing technique.

2.0 Image Information Sharing Technique

Figure 2:
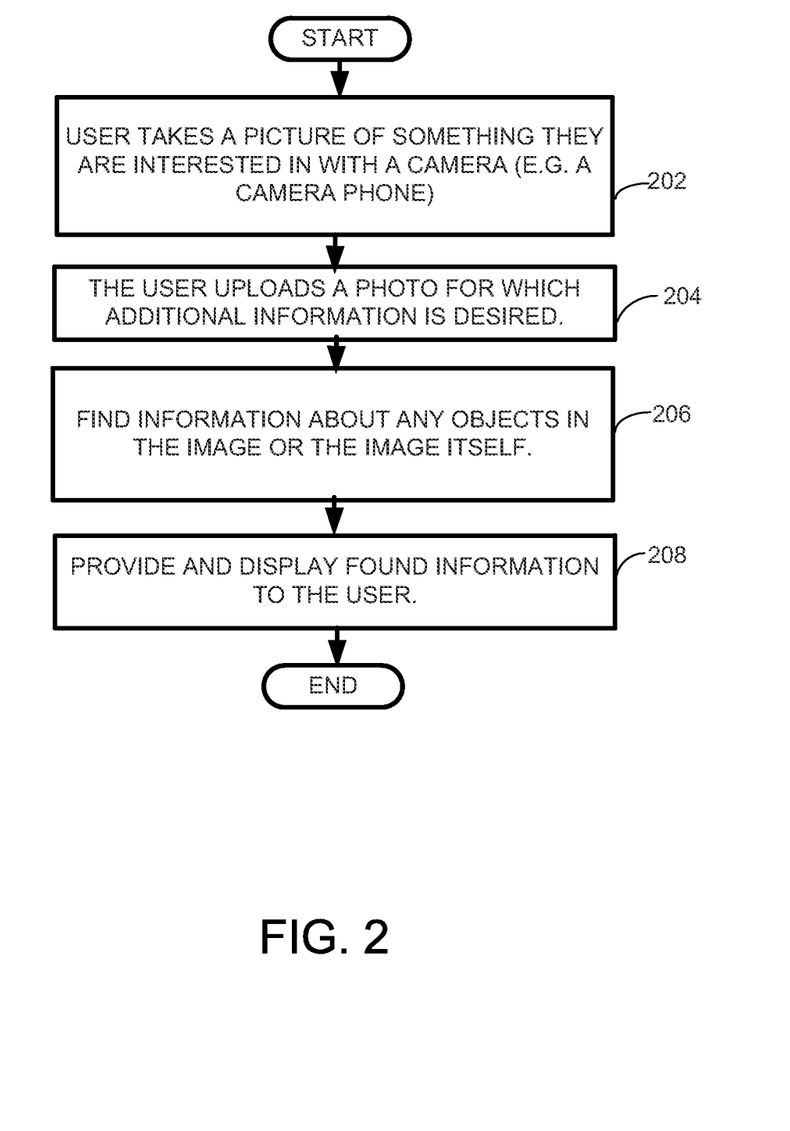
FIG. 2 is a diagram depicting the general concept employed in one embodiment of the present image information sharing technique.

In a most general sense, the image information technique allows a user to obtain information about an object just using its image. As shown in FIG. 2, the user takes a picture of something they want more information about (box 202). For example, they could take this picture with a camera phone. The user then sends the image via a network to a server entity (which could be one or more servers) (box 204). The server entity then finds additional information about the object in the image (box 206), or the image itself, and provides this to the user (box 208).

More specifically, in one embodiment of the present image information sharing technique, digital images containing relevant comments and links to web pages are supplied by a set of authors. A user of the image information sharing technique takes a photograph or otherwise acquires an image of something that interests them, such as, for example, a poster, a product, a painting. This photo or image is then uploaded to an image information sharing server (or servers). The image information sharing technique then matches the photo or an object in the photo uploaded to the image information sharing server to an object in an image in an image information sharing database. If a match is found, the comments and web links associated with the matched photo in the image information sharing database are subsequently sent to the user.

The present image information sharing technique allows a user to query a database using images vice keywords. For processing user queries the image information sharing technique can rely entirely on the content of the image image sent by the user. This eliminates the need to annotate an image before querying the image information sharing database.

2.1 Architecture.

Figure 3:
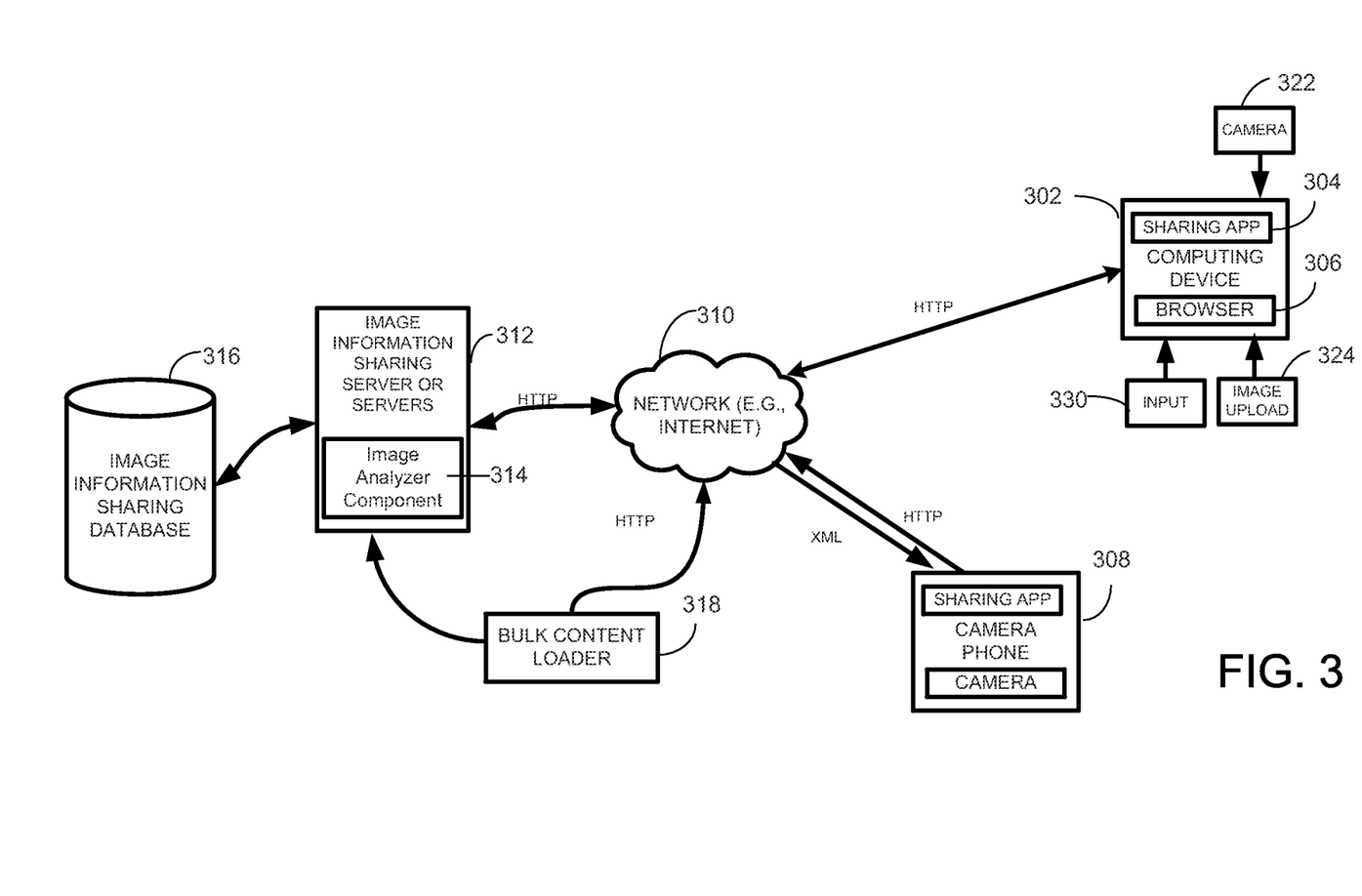
FIG. 3 is a diagram depicting a high level system architecture and operating environment employed in one embodiment of the present image information sharing technique.

FIG. 3 provides an exemplary architecture wherein the present interactive image information sharing technique can be practiced. In the most general terms, in one embodiment, the image information sharing architecture can include a standard computing device 302 (such as described with respect to FIG. 1) with an Image information sharing application 304, a browser 306, a connection to a network such as the Internet, and one or more input devices, such as a keyboard and/or a mouse, 320. The standard computing device 302 could be in one of many configurations such as, for example, a desktop computer, a notebook computer, a Personal Data Assistant, or a Tablet PC, to name a few. The standard computing device 302 can also have a camera 322 or other means for capturing images 324. A user can use the computing device 302 to author images such as, for example, by adding website links and comments to them. A user can also use the computing device 302 to manage any images that reside on it, for example, by editing, deleting or adding them.

In one embodiment of the present image information sharing technique, the computing device can also be a cellular telephone (for example, a Smartphone) 308 with a camera and network connectivity and an image information sharing application installed on it for sending images to, and receiving information from, the image information sharing server. In one embodiment a user can also use the phone 308 to capture images and to add comments to them. It should be noted that the computing device 302 and camera phone 308 are only exemplary in nature and that many other types and numbers of computing devices can be employed with the image information sharing technique.

Both the standard computing devices 302, and any specialized computing devices such as the camera phone 308, can be clients to an image information sharing server 312 which accesses an image information sharing database 316 of images. The clients communicate with the server (although several servers could be used) 312, preferably via a network such as, for example, the Internet 310. The image information sharing server has a content-based image retrieval image analyzer 314 which is used to match images in the image information sharing database 316 to any image sent to the image information sharing server 312 by a client. As discussed previously, the images in the image information sharing database 316 are preferably authored to contain additional information about the image, such as, for example, comments about objects in the image, search term keywords that can be associated with the object, location of the image or objects in the image and relevant website links for obtaining additional information about the image or objects in the image. In one embodiment of the present image information sharing technique, anyone that has an image information sharing application can author images by adding comments or website links to them prior to uploading them to the image information sharing database 216. In another embodiment, image authoring can be limited to authors that are assigned a certain level of privilege. In yet another embodiment, querying the image information sharing database, as well as authoring and uploading images to the image information sharing server and database is limited to subscribers of an image information sharing service employing the architecture.

Either the standard computing device 302 or the camera phone 308 can send an image to one or more image information sharing servers 312 in an attempt to obtain more information about objects in the image from the image information sharing database 316. The computing device 302 typically accesses the image information sharing server via an image information sharing website and a browser. Once the image information sharing server 312 obtains the image from a computing device 302 or camera phone 308 clients, it uses the content-based image retrieval analyzer 314 to determine if there is a match of an object in the image received from the client to one that exists in the image information sharing database 316. If a match is found, the image information sharing server 312 extracts information (e.g., comments, location, website links) from the image in the image information sharing database 316, and sends this back (in one embodiment along with a thumbnail of the image in the database) to the client that sent the image. Once the client (computing device 302, smart phone 308) receives the information it can be used for various purposes, such as linking to other sources of information.

In one embodiment, the image information sharing architecture includes a bulk content loader 318 which can connect to the image information sharing server via a network or directly. The bulk content loader 318 enables the mass import of searchable images into the image information sharing server 312. The bulk loader permits many images to be loaded in a fast, convenient manner (an alternative would be to load them one-at-a-time via the web page). In one embodiment the loader pre-populates the database with certain images.

Obtaining additional information on objects in images submitted to the image information sharing server is a synchronous user experience, which is different from other two-part "email the image first, then wait for the response email" style systems. Since, in one embodiment, the image information sharing application is used to send the image to be used to query the image information sharing database the image information sharing technique is independent of an email system and hence faster and more convenient in transmission and receipt of images and image information. This is particularly true when the client is a cellular smart phone, as typing using the very small keyboard typical in such a device is often tedious and frustrating. In one embodiment a cellular phone is equipped with a button to activate the sending of an image on the phone to the Image information sharing server. In this embodiment a user merely needs to take a picture and press the send button to send a captured image to the server in order to query the Image information sharing database.

2.2 Overview of the Image Information Sharing Process.

Figure 4:
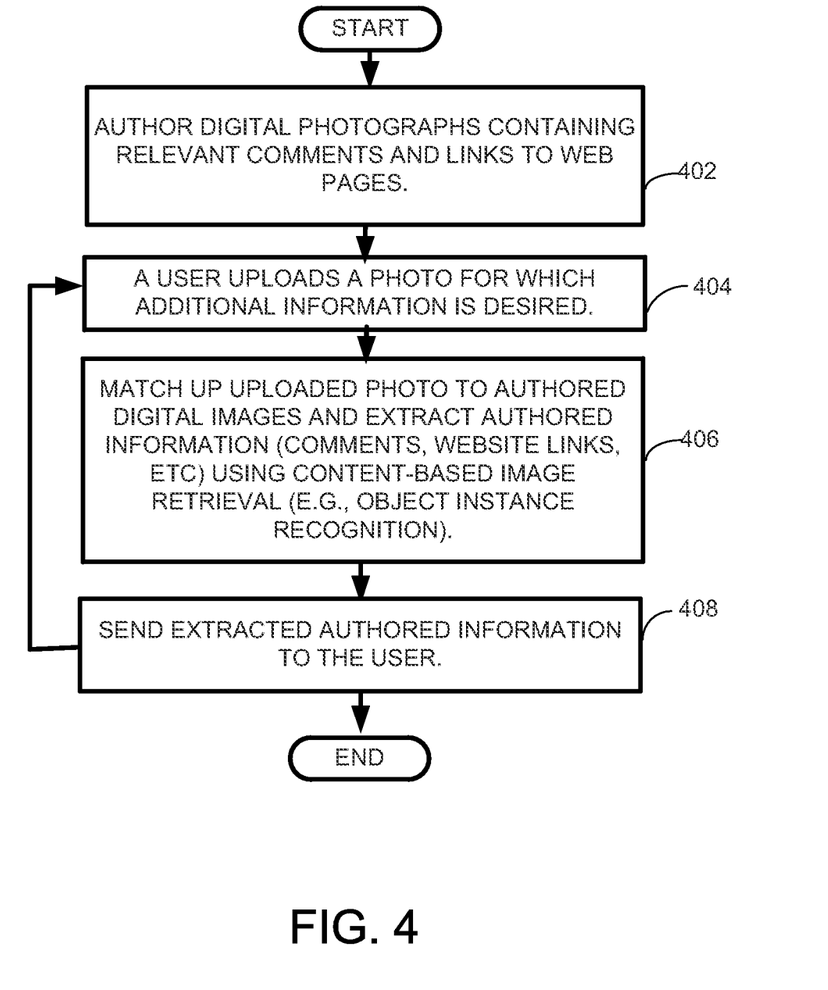
FIG. 4 is a flow diagram depicting one exemplary embodiment of a process employing the present image information sharing technique.

FIG. 4 provides an exemplary flow diagram of one embodiment of the present image information sharing technique. Images containing relevant information about an object in an image, such as, for example, comments and links to web pages are supplied by a set of authors (box 402). A user of the image information sharing technique takes a digital picture of something that interests them, such as, for example, a poster, a product, a painting, or acquires it from another source, and uploads it to an image information sharing server (box 404). The image information sharing technique then matches the user acquired image to an image in an image information sharing database using a content-based image retrieval technique (box 406). The comments and web links associated with the matched photo are subsequently sent to the user (box 408). This process of uploading images to obtain additional information about an object in the uploaded image can be repeated by this user and others (boxes 404, 406, 408).

The following sections provide details of the above-described architecture and process.

2.2 Authoring Content.

Figure 5:
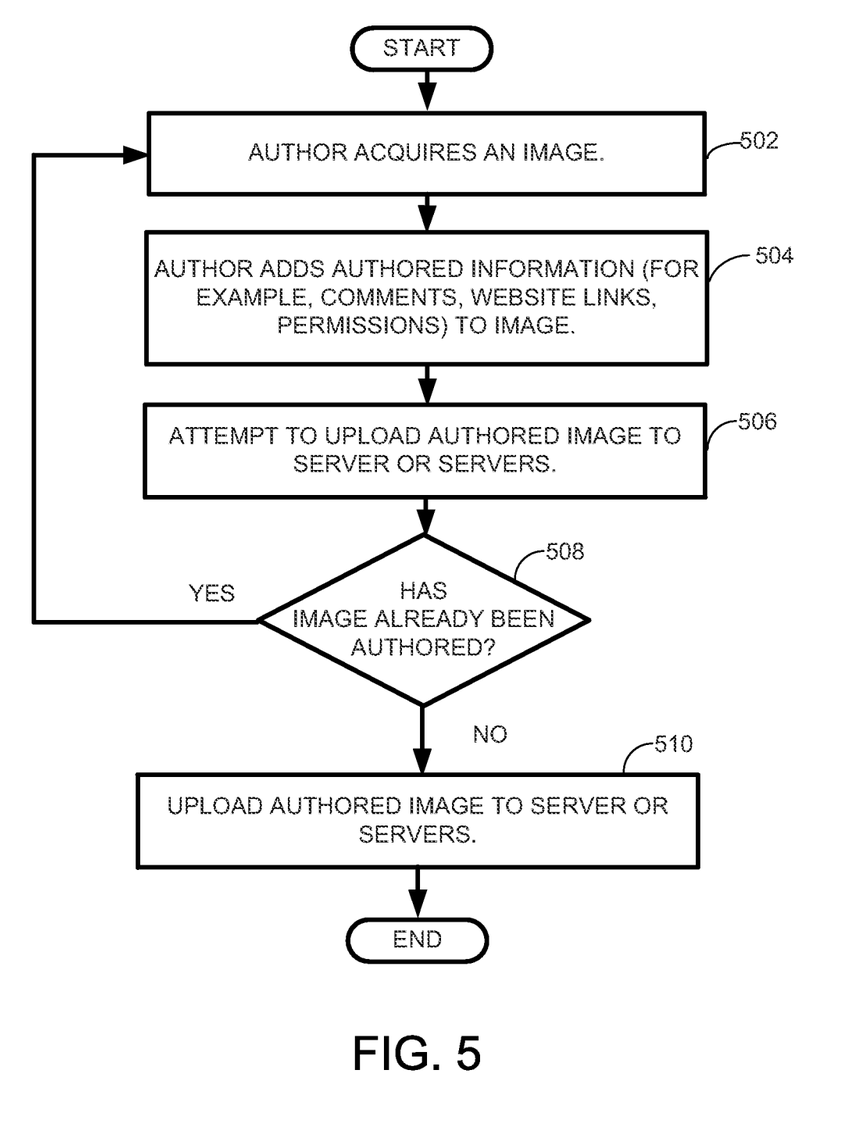
FIG. 5 is a flow diagram depicting one exemplary embodiment of an image authoring process employed in the present image information sharing technique.

Image information sharing authors supply content to the image information sharing database. In one embodiment, anyone in the general public, who has registered with an image information sharing service can be an author. An author supplies a digital image used for matching, along with information about the image. This image may be a digital photograph or one synthetically generated (such as, for example, by using an image editing or creating application). The information included with the image may include a web page relevant to the image or comments about the content of the image. The author may also choose whether other people can add comments and/or web page links to the image. More specifically, as shown in FIG. 5, an author captures an image or acquires it in some other manner (box 502). The author then appends information about the image, such as relevant web site addresses or location. In addition the author can add permissions to the image, such as whether other people can append their information (box 504). The author then attempts to upload the image to the image information sharing database (boxes 506, 508). If the authored image is already on the server, the process starts over (boxes 502 through 506). If the image is not already authored, the authored image is uploaded to the server or servers (boxes 508, 510).

In one exemplary embodiment of the present technique, many images are loaded at once using a bulk loader, as discussed previously with respect to FIG. 3.

2.3 Uploading a Query.

Figure 6:
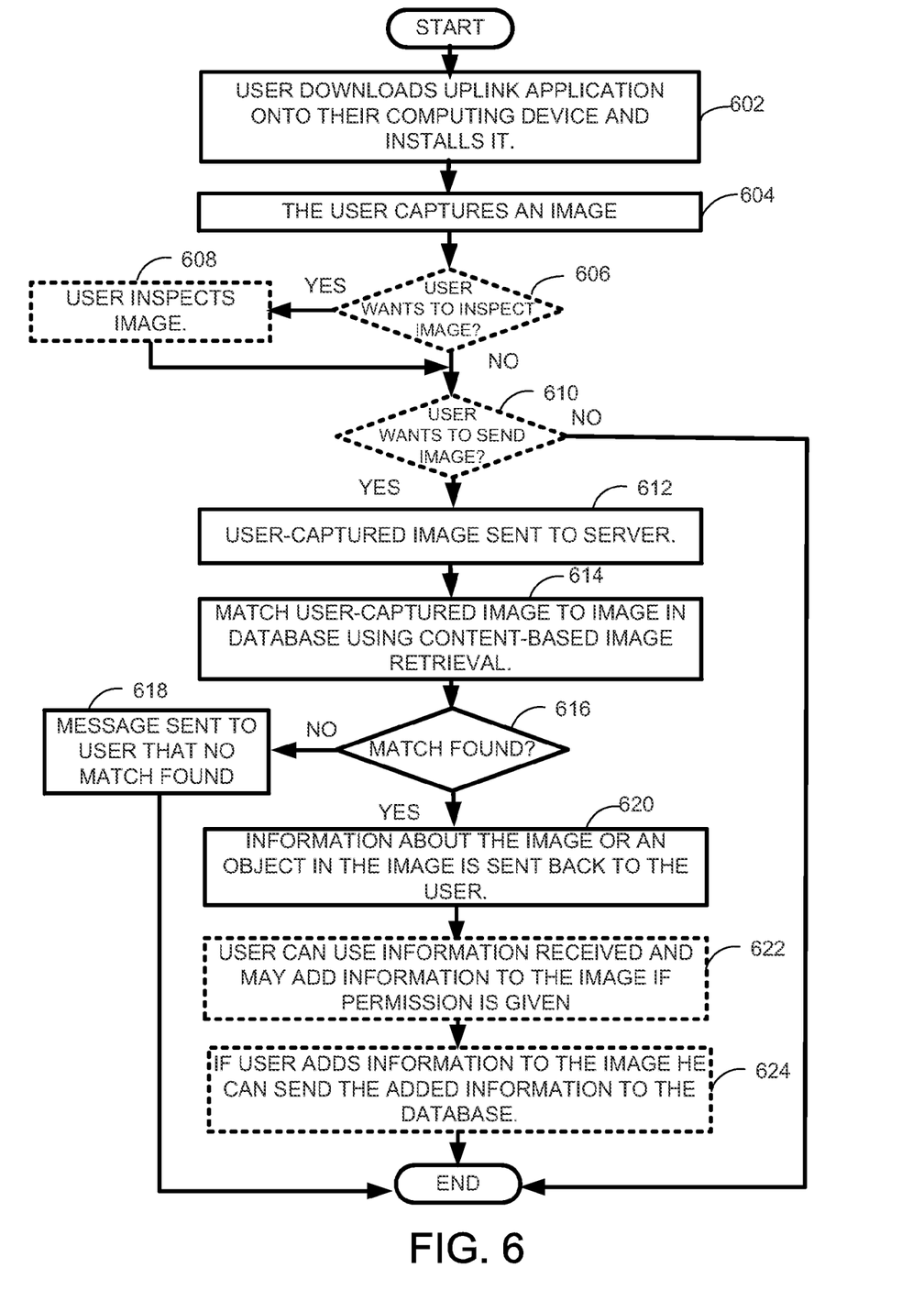
FIG. 6 is a flow diagram depicting one exemplary process of uploading a query image to the image information sharing database using a camera phone.

The image information sharing technique can upload image to query the image information sharing database in a variety of ways. In one embodiment, the uploading is from an image information sharing application. In another embodiment it is from a web site. In regard to the image information sharing application the program runs in the background of the computing device such as a standard computing device or a camera phone. For example, in the context of a camera phone, the image sharing technique, the user downloads the image information sharing application onto their cellular phone and installs it (FIG. 6, box 602). Once the image information sharing application is launched, the user captures or otherwise acquires a photograph of an object they are interested in (box 604). Once captured, the user can optionally inspect the photo and if desired send it to the image information sharing server (box 606, 608, 610). A captured photo may also be sent directly to the image information sharing server or servers, without inspection (box 610). The uploaded photo is matched against image information sharing database (box 614) and if no match is found, a message is sent to the user saying so (box 618). If a match is found, information about the photo is sent back to the user (box 616, 620). On the user's cellular phone, comments about the photo as well as links to web pages associated with the photo are displayed. The user may follow the web link, read comments left by users, or if permission is given for that photo, the user can add their own comments and/or links (box 622).

In regard to the website embodiment for content uploading, once a photo is captured it can be uploaded to the image information sharing server from an image information sharing website on the computing device.

Figure 7:
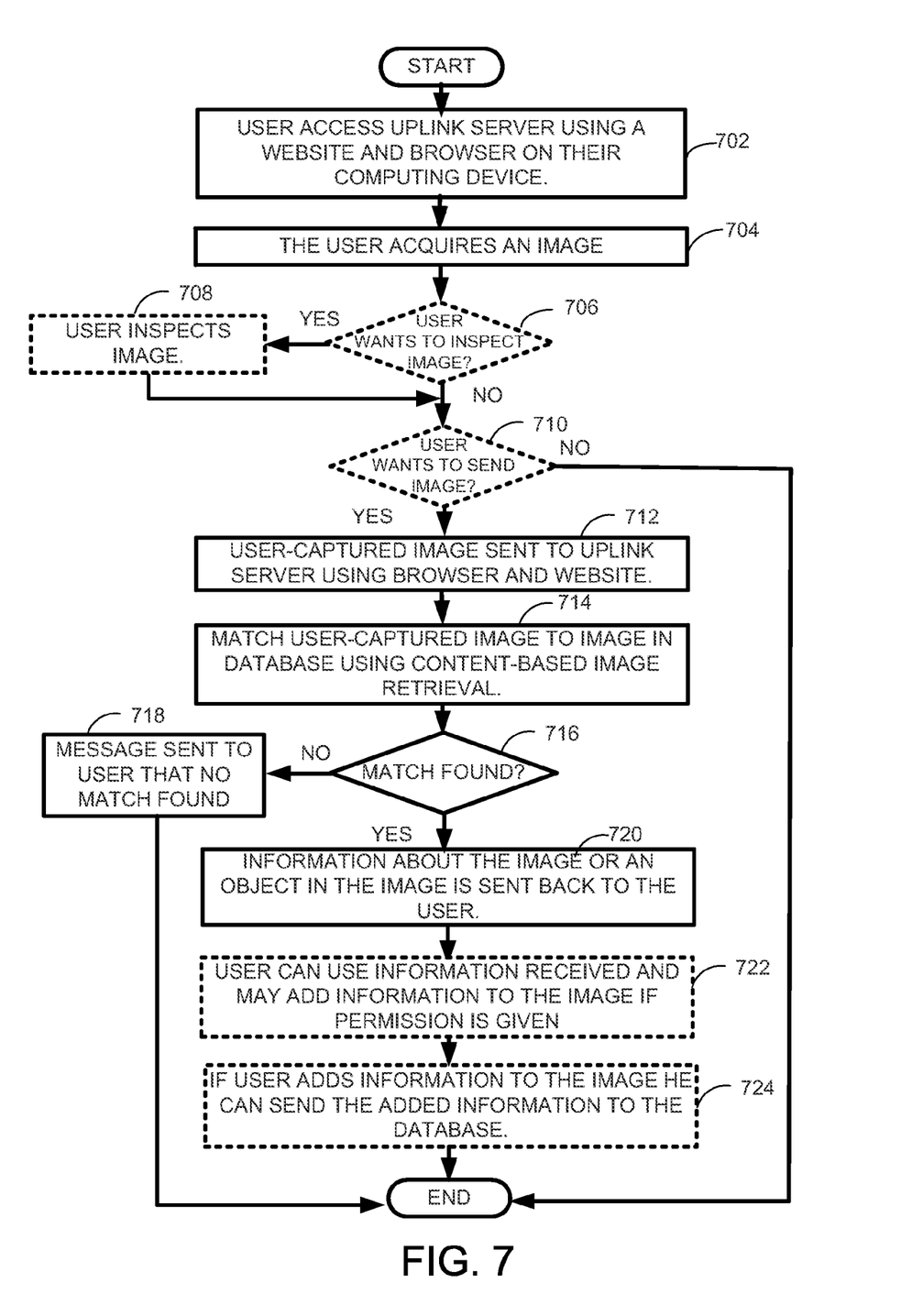
FIG. 7 is a flow diagram depicting one exemplary process of uploading a query image to the image information sharing database using a standard computing device.

More specifically, as shown in FIG. 7, in one embodiment of the image information sharing technique, the user accesses the image information sharing server via a website from their computing device (FIG. 7, box 702). Once the image information sharing website is accessed, the user acquires a photograph of an object they are interested in (box 704). Once acquired, the user can optionally inspect the photo and if desired send it to the image information sharing server (box 706, 708, 710). The captured photo may also be sent directly to the image information sharing server, without inspection (box 710). The uploaded photo is matched against image information sharing database (box 714) and if no match is found, a message is sent to the user saying such (box 718). If a match is found, information about the photo is sent back to the user (box 716, 720). On the user's computer display, comments about an object in the photo as well as web page links associated with an object in the photo are displayed. The user may follow the web links, read comments left by users, or if permission is given for that photo, the user can add their own comments and/or links (box 722).

In one embodiment, additional processing can be done on the user's computing device so that the information used for matching, known as the image signature, is extracted from the image. The image signature, instead of the image, can then be sent to the image information sharing server or servers for matching. In this embodiment, computational resources of the server can be saved since the image processing is done on the user's computing device. Furthermore, it may be impossible to reconstruct the user's image from the image signature, increasing the user's privacy. This embodiment will be discussed in more detail later.

2.4 Matching an Uploaded Image to an Image in the Database.

The present image information sharing technique matches the user's uploaded image to an image in the image information sharing database. For example, in one embodiment the technique uses a content-based image retrieving technique described in a co-pending patent application entitled "OBJECT INSTANCE RECOGNITION USING FEATURE SYMBOL TRIPLETS", filed on Jan. 27, 2006, and assigned Ser. No. 11/342,218. This object instant recognition image matching technique is called the feature symbol triplets object instance recognition method.

In general, the feature symbol triplets object instance recognition method finds an object in an image that is uploaded by a user to the image information sharing server by comparing portions of the object to images in the Image information sharing database. If the object in the uploaded query image matches one of the images in the database, the object is identified and information regarding the image is sent back to the user.

Figure 8:
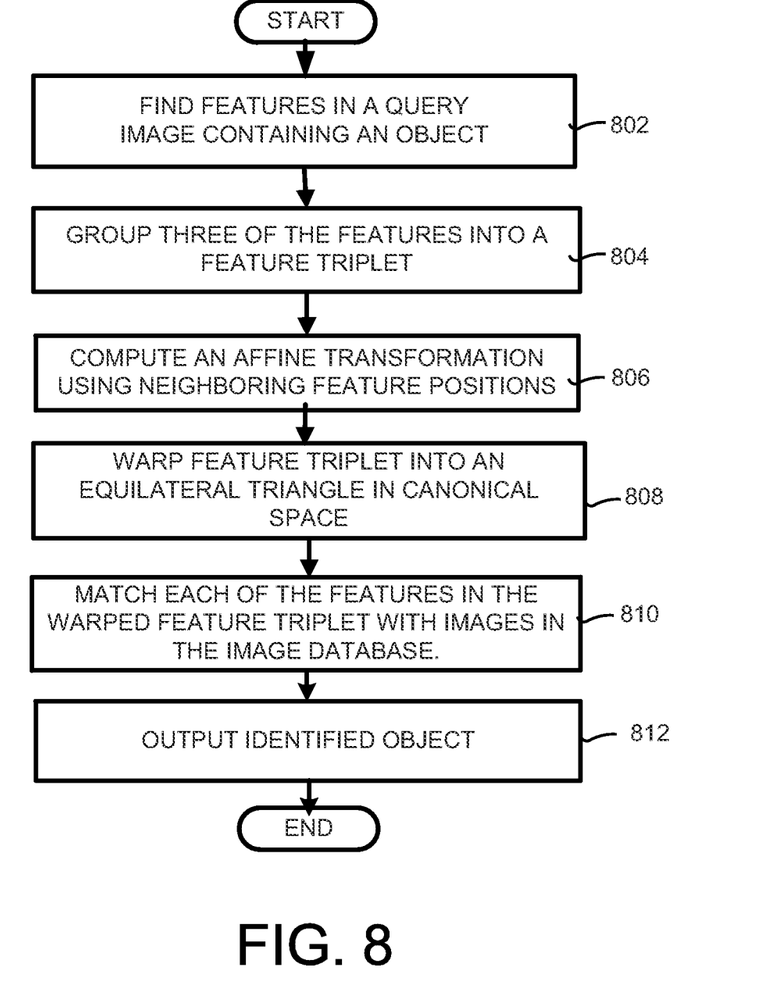
FIG. 8 is a flow diagram depicting one exemplary embodiment of a process for matching an uploaded image to an image in the database employed in the present Image information sharing.

In particular, as shown in FIG. 8, the feature symbol triplets object instance recognition method begins by finding features in a query image (the image uploaded by the user), where the query image contains at least one object (box 802). A group of three features are found in the query image and grouped into a feature triplet (box 804). Next, an affine transformation is computed using neighboring feature positions (box 806). In other words, for each of the three features in the feature triplet the affine transformation for that feature is computed using its neighboring other two features in the triplet.

The computed affine transformation is used to warp the feature triplet into a geometric shape in canonical space (box 808). This geometric shape takes the form of a triangle. In a one embodiment, the geometric shape is an equilateral triangle. Next, each of the features in the warped feature triplet is matched with triplets of features in the images in the image information sharing database (box 810). Comparing triplets of features, instead of individual features used by other search methods, enhances the likelihood of finding a match. The result of this matching is an identified object and any information associated with the object such as web site links and other information provided by the author of the image in the image information sharing database (box 812).

In one embodiment, the extraction of triplet information (or if another method is used for matching the uploaded image to the database, the information used to determine a match) can be done on the image information sharing server or servers or on the user's computational device. If the image signature consisting of the triplet information is extracted on the user's computational device, only the image signature and not the original image needs to be sent to image information sharing server.

Figure 9:
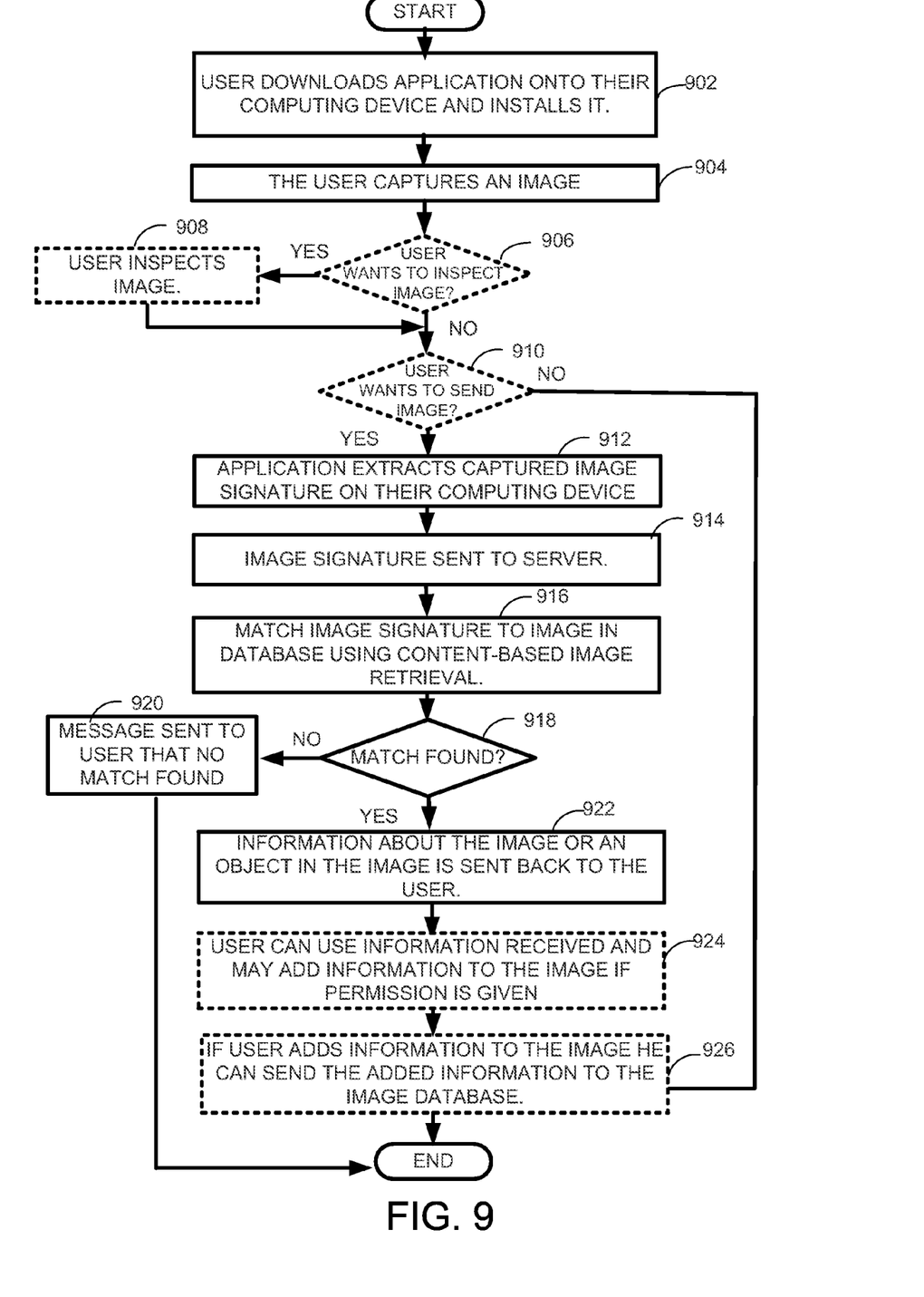
FIG. 9 is another flow diagram depicting one exemplary embodiment of a process for matching an uploaded image to an image in the database employed in the present Image information sharing.

An exemplary embodiment employing the technique described in the paragraph above is shown in FIG. 9. The user accesses the image information sharing server via a website from their computing device (FIG. 9, box 902). Once the image information sharing website is accessed, the user acquires a photograph of an object they are interested in (box 904). Once acquired, the user can optionally inspect the photo and decide whether to send it to the image information sharing server or servers (boxes 906, 908, 910). If the user decides they want more information on the image or an object in the image, an image signature (information used for matching) is extracted (block 912) and the image signature or other information is sent to the image information sharing server (box 914). The uploaded image signature or other information used for matching is matched against the image information sharing database (box 916) and if no match is found, a message is sent to the user saying such (box 918, 920). If a match is found, information about the image or object in the image is sent back to the user (box 918, 922). On the user's computer display, comments about an object in the photo as well as web page links associated with the image or object in the image are displayed. The user may follow the web links, read comments left by users, or if permission is given for that photo, the user can add their own comments and/or links (box 924, 926).

It should be noted, however, that any content-based image retrieval technique, or object instance recognition technique, can be used for matching the user uploaded image to an image in the image information sharing database.

2.5 Exemplary Applications

The image information sharing technique can be used for many, many purposes. For example, it is possible for an image information sharing user to take a photo of a billboard, subway advertisement, magazine or newspaper advertisement and get more information about the product in the advertisement (for example, the user can be directed to a promotion-specific web site, or the corresponding television advertisement). This is significantly better for the advertiser than hoping the user will type in a website address on their phone.

Another exemplary application involves a user taking a photo of a consumer product box and receiving prices at various retail outlets or web sites to ensure that they are getting the best deal. Or a user can take a photo of a movie advertisement in the paper and see the trailer, get reviews, or be provided with local playing times.

Yet another application involves a user taking a photo of a restaurant card (or signage) and receiving a menu, reviews, or health department violations. Likewise, another application involves a user taking a photo of a concert or album promotion poster and receiving tickets or hearing a sample track.

Still another application involves a user taking a photo of bus number on printed timetable and receiving real-time information on the location of the bus, or just access to an online timetable. Or another application involves a user taking a photo of a beer mat and accessing bar jokes; or taking a photo of printed place mats and getting access to restaurant recipes.

Still another application involves a user taking a still image in a TV advertisement as a way to receive coupons. TV shows can do the same to give access to fun show facts or show related material. Or another application involves a user taking a photo of a resort in a travel brochure and receiving a multimedia virtual tour of the resort.

The above examples of how the present image information sharing technique can be employed are not meant to be exhaustive in nature. There are many other ways that the technique could be used.

It should also be noted that any or all of the aforementioned embodiments throughout the description may be used in any combination desired to form additional hybrid embodiments.

Wherefore, what is claimed is:

1. A computer-implemented process for obtaining information about an object in an image, comprising:
    authoring images by appending information about an object in each image to obtain a database of authored images;
    acquiring an image containing an object;
    matching the object in the acquired image to an object in an authored image in the database using a content-based image retrieval technique wherein the matching matches the object in the acquired image to an object in an authored image in the database by using the contents of the acquired image in the database and the authored image themselves, rather than relying on image metadata, by using triplets of image features warped into equilateral triangles, comprising:
        finding features in the acquired image;
        grouping three of the features into a feature triplet;
        computing an affine transformation using two neighboring feature positions for each feature in the feature triplet to warp the feature triplet into an equilateral triangle in canonical space; and
        matching each of the features in the feature triplet of the acquired image with features in a feature triplet of the authored images in the database to identify the object in the authored images; and
    extracting the appended information about the object that was found in the matched images from the matched authored image;
    sending the extracted appended information, and not the image in the image database to a client for use in locating additional information from different sources for the object in the acquired image.

2. The computer-implemented process of claim 1 wherein the following actions are repeated to obtain information on one or more additional objects in images:
    acquiring an image containing an object at a client;
    matching the object in the acquired image to an object in an authored image in the database using a content-based image retrieval technique comprising using triplets of features warped into equilateral triangles to match the object in the image uploaded to the server to an object in an authored image; and extracting the appended information about the object that was found in the matched image from the matched authored image.

3. The computer-implemented process of claim 1 wherein the client is a cellular phone.

4. The computer-implemented process of claim 1 wherein the appended information comprises comments about an object in an authored image and a website address relevant to an object in the authored image.

5. The computer-implemented process of claim 1 wherein the content-based image retrieval technique is an object instance recognition technique.

6. The computer-implemented process of claim 1 wherein the database resides on a server.

7. The computer-implemented process of claim 1 wherein the database is accessed over a network.

8. A computer-implemented process for obtaining information about an object in an image, comprising:
   acquiring an image containing an object;
   computing information used for matching the object in the acquired image using information in the image itself vice metadata;
   querying a database using the computed information used for matching;
   matching the object in the acquired image to an object in an image in the database using a content-based image retrieval technique with the computed information used for matching wherein the content-based image retrieval technique uses triplets of features wherein each feature triplet is warped into an equilateral triangle in order to match the object in the acquired image to an object in the image in the database, comprising:
      finding features in the acquired image;
      grouping three of the features into a feature triplet;
      computing an affine transformation using two neighboring feature positions for each feature in the feature triplet to warp the feature triplet into an equilateral triangle in canonical space; and
      matching each of the features in the feature triplet of the acquired image with features in a feature triplet of the images in the database to identify the object in the images in the database;
   extracting only information about the matched object from the image in the database; and
   sending only the extracted information, and not the image in the database, to a client.

9. The computer-implemented process of claim 8 wherein the images in the database are appended with information comprising comments about the object; and wherein the comments about the object are received at a client that queried the database.

10. The computer-implemented process of claim 8 wherein the images in the database are appended with a website address for obtaining additional information about the object; and wherein the website address for obtaining additional information about the object are received at a client that queried the database.

11. The computer-implemented process of claim 8 wherein the images in the database are appended with one of:
   location information about the object; or
   key words helpful in searching for other information about the image.

12. A system for querying a database, comprising:
   a general purpose computing device;
   a computer program comprising program modules executable by the general purpose computing device, wherein the computing device is directed by the program modules of the computer program to,
   acquire an image of an object at a client; and
   query a database for the object using the acquired image;
   match the object in the acquired image to an object in an image in the database using an object instance recognition technique that automatically recognizes a particular object from a category of objects of the same type by using feature triplets, each comprising three image features, warped into equilateral triangles using an affine transformation, comprising:
      finding features in the acquired image;
      grouping three of the features in the image into a feature triplet;
      computing an affine transformation using two neighboring feature positions for each feature in the feature triplet to warp the feature triplet into an equilateral triangle in canonical space; and
      matching each of the features in the feature triplet of the acquired image with features in a feature triplet of the images in the database to identify the object in the images in the database;
   send information about the object in the matched image from the image in the database to a client.

13. The system of claim 12, wherein the images in the database are appended with a website link by an author with a certain level of privilege.

14. The system of claim 13 further comprising a module for the client to compute an image signature and wherein the image signature is used to query the database and match the acquired image to an image in the database.

15. The system of claim 14 wherein a user must subscribe to a service to use the system and wherein only users that subscribe to the service to use the system can upload images to the database to extract information about the object from the image in the database.

16. The system of claim 12 wherein the database contains images and wherein the images and information that can be extracted are uploaded in bulk using a bulk loading module.

17. The system of claim 12 wherein the client is a cellular phone that can query the database by pushing a single control device on the cellular phone to send an image with which to query the database.

* * * * *